(No Model.)
H. B. LARZELERE.
TRACTION WHEEL.
No. 331,068. Patented Nov. 24, 1885.
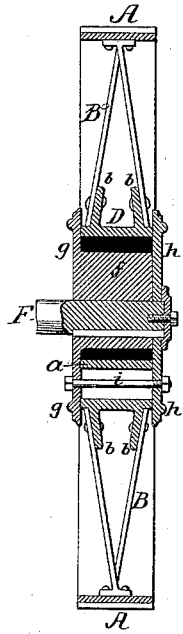
FIG. 1.
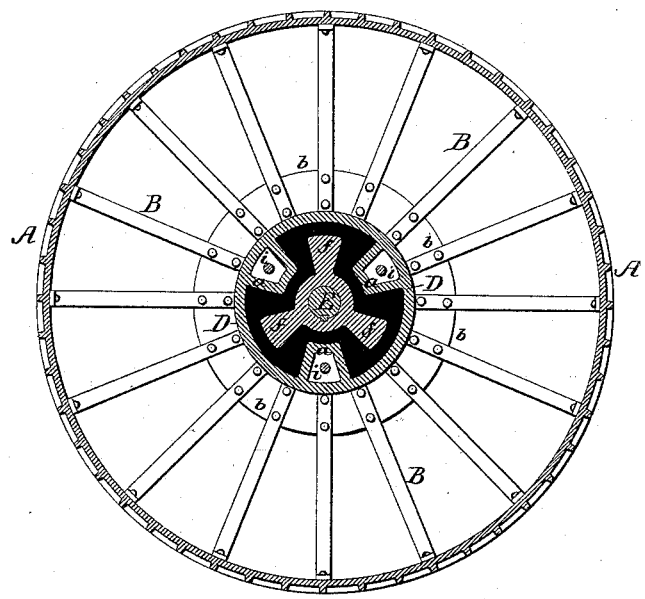
FIG. 2.
FIG. 3.
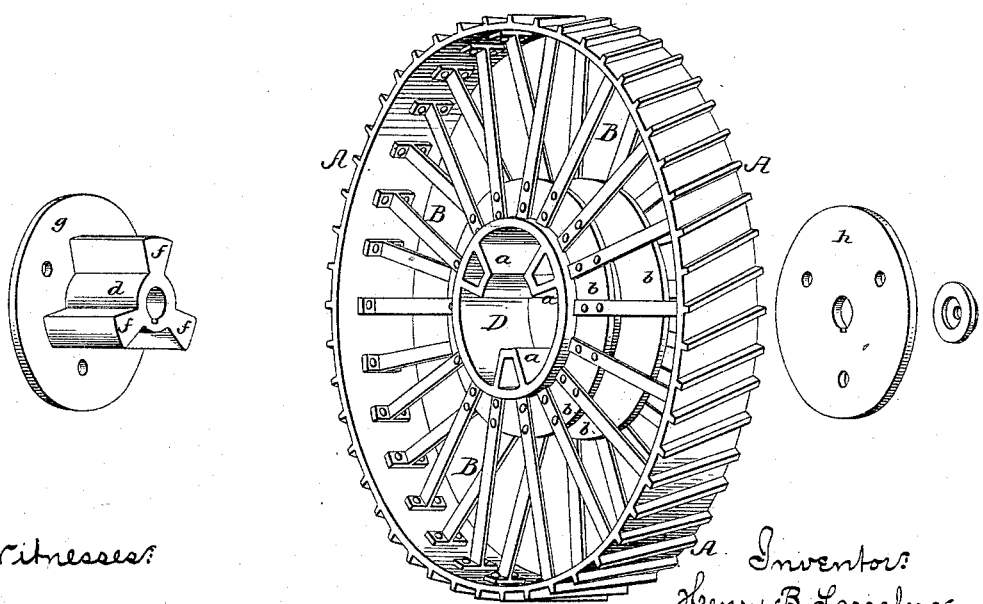
Witnesses:
John E. Parker
Harry Drury
Inventor:
Henry B. Larzelere
by his Attorneys
Howson & Son

UNITED STATES PATENT OFFICE.

HENRY B. LARZELERE, OF GREENCASTLE, PENNSYLVANIA.

TRACTION-WHEEL.

SPECIFICATION forming part of Letters Patent No. 331,068, dated November 24, 1885.

Application filed April 13, 1885. Serial No. 162,110. (No model.)

*To all whom it may concern:*

Be it known that I, HENRY B. LARZELERE, a citizen of the United States, and a resident of Greencastle, Franklin county, Pennsylvania, have invented certain Improvements in Driving-Wheels for Traction-Engines, of which the following is a specification.

The object of my invention is to so construct a driving-wheel for traction-engines as to relieve the strain upon the engine and gearing, due to inequalities in the road and uneven strain upon the wheel; and this object I attain in the manner which I will now proceed to describe, reference being had to the accompanying drawings, in which—

Figure 1 is a transverse vertical section of my improved driving-wheel for traction-engines; Fig. 2, a longitudinal section of the same, and Fig. 3 perspective views of the different parts of the wheel detached from each other.

A is the ribbed rim or tire of the wheel, and B the usual wrought-iron spokes connecting said tire to the hub, the latter consisting of an annular shell, D, with internal ribs, $a$, and external flanges, $b\ b$, the inner ends of the spokes being bolted or riveted to the latter, as shown.

F is the shaft or axle, to which the power is applied by any suitable system of gearing, and keyed or otherwise rigidly secured to this shaft is a sleeve, $d$, with three radial arms, $f$, the sleeve also having at one end a disk or plate, $g$, which closes one end of the hub, a similar disk, $h$, closing the opposite end of the hub, and the two disks being connected together by bolts $i$, which pass through the internal ribs, $a$, of the hub, said ribs being made hollow for this purpose. The space between the sleeve $d$ and its ribs $f$ and the annular shell D of the hub and its internal ribs, $a$, is filled with rubber or other elastic material, (indicated by the black section in Figs. 1 and 2,) this filling providing an elastic cushion between the driving-shaft and the hub of the wheel, so as to absorb shocks due to the jolting of the machine and prevent the transmission of the same to the gearing. Moreover, the transmission of circumferential movement to the wheel from the shaft or axle is also effected through the medium of this elastic cushion, so that any interruption to the free rotation of the wheel can exercise no severe strain upon the axle and driving-gears, nor can there be any like strain due to a sudden increase in the speed of the engine, as in machines in which the driving-gear is connected directly to the axle.

I am aware that springs have been used to prevent the transmission of vertical jars from a wheel to an axle, and also that elastic cushions have been interposed between arms on a shaft and internal arms on a hub, so that rotary motion would be transmitted from one to the other through the medium of these elastic cushions; but I am not aware that an internally-ribbed hub and a ribbed sleeve or axle have been combined with an interposed mass of elastic material in the manner shown by me, so that said elastic material will absorb both vertical and circumferential strains.

I claim as my invention—

1. The combination of the driving-wheel having a hub with internal ribs, $a$, the driving-shaft having a sleeve with projecting ribs $f$, and the elastic filling forming a cushion between the ribs $a$ and $f$, between said ribs $a$ and the sleeve, and between the ribs $f$ and the hub, all substantially as set forth.

2. The combination of the wheel having a hub with internal hollow ribs, $a$, a shaft, F, having a sleeve with ribs $f$ and disk $g$, the elastic filling, the disk $h$, and the confining-bolts $i$, passing through the hollow ribs $a$, as set forth.

In testimony whereof I have signed my name to this specification in the presence of two subscribing witnesses.

HENRY B. LARZELERE.

Witnesses:
L. J. LARZELERE,
JERE. WEAGLY.